March 18, 1930.  H. E. BROOKBY  1,750,621
PLASTER WALL BOARD AND METHOD OF MAKING SAME
Filed June 5, 1926  2 Sheets-Sheet 1

INVENTOR
HARRY E. BROOKBY
BY
ATTORNEY

March 18, 1930. H. E. BROOKBY 1,750,621
PLASTER WALL BOARD AND METHOD OF MAKING SAME
Filed June 5, 1926 2 Sheets-Sheet 2

INVENTOR:
HARRY E. BROOKBY
BY Kent W. Nonnell
ATTORNEY

Patented Mar. 18, 1930

1,750,621

UNITED STATES PATENT OFFICE

HARRY E. BROOKBY, OF EVANSTON, ILLINOIS, ASSIGNOR TO UNITED STATES GYPSUM COMPANY, OF CHICAGO, ILLINOIS, A CORPORATION OF ILLINOIS

PLASTER WALL BOARD AND METHOD OF MAKING SAME

Application filed June 5, 1926. Serial No. 113,845.

This invention relates to a wall board and method of making same and has reference more particularly to a wall board having a plastic core of calcined gypsum or other suitable wall board filler, and which is fluted longitudinally of the board.

The invention further relates to the method of making the above wall board continuously and applying to the fluted core a complete fibrous covering of paper or the like.

The object of this invention is to provide a wall board having a plastic core of calcined gypsum in which flutes or corrugations are formed so as to form air spaces for improving the heat insulating qualities of the wall board.

Another object of the invention is to provide a corrugated wall board as above noted in which the flutes are interrupted at intervals to provide ribs, which strengthen the material laterally. A further object of the invention is to provide a corrugated wall board which is economical in the use of plastering materials and which is lighter in weight than other wall boards without flutes; and also to improve wall boards and their methods of manufacture in other respects hereinafter specified and claimed.

Figure 1:
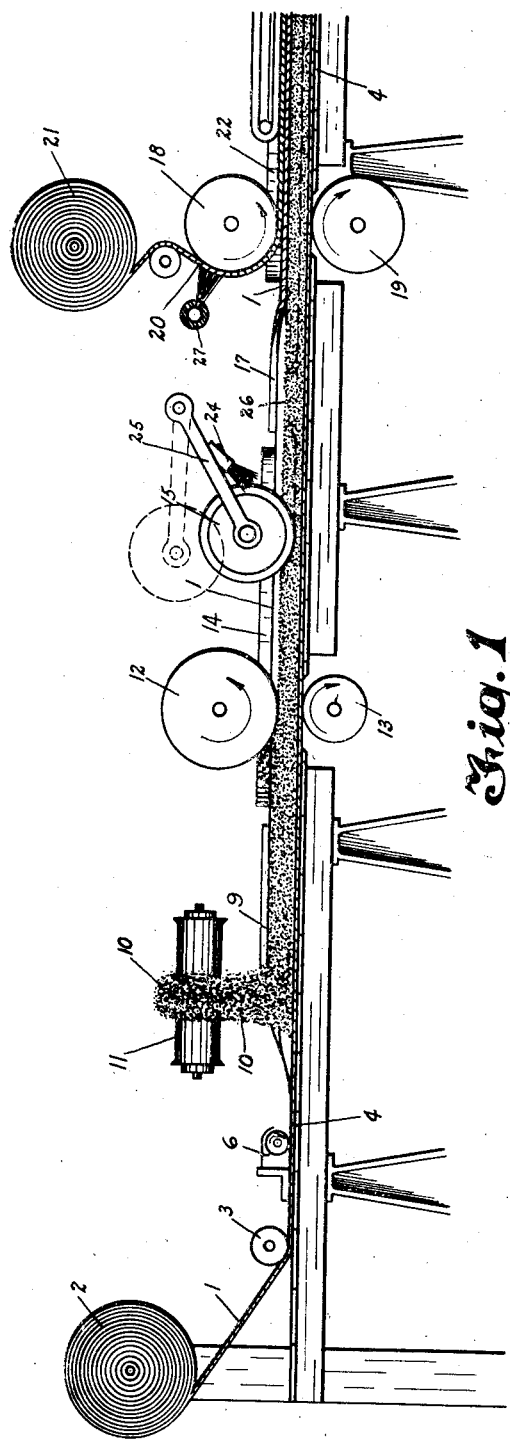
Figure 2:
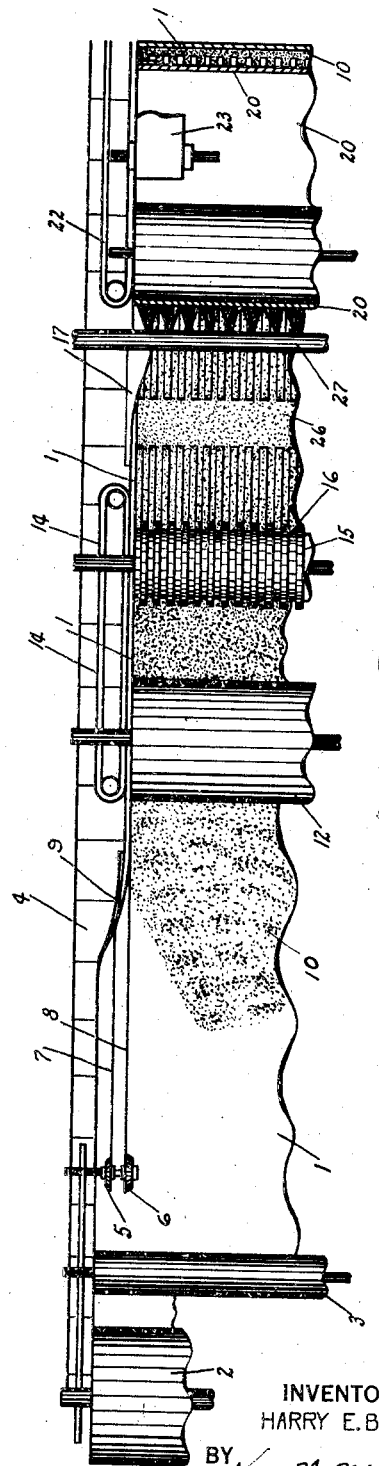
Figure 3:
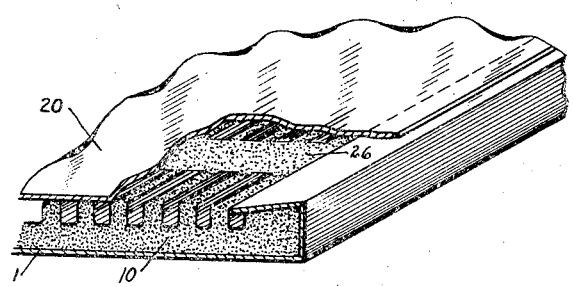
Figure 4:
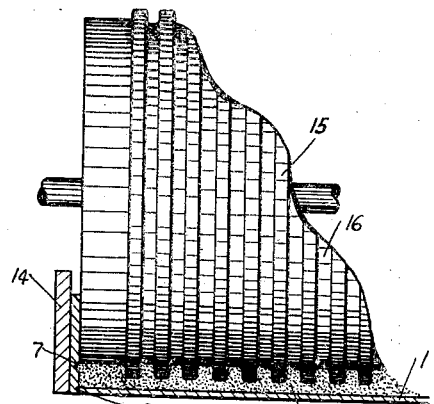
Figure 5:
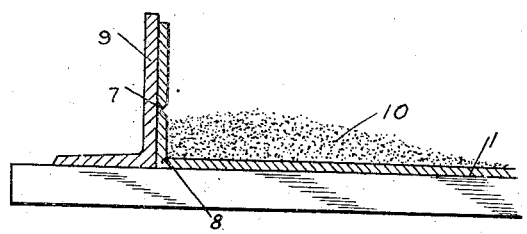

In the accompanying drawings Fig. 1 is a side elevation partly in section illustrating more or less diagrammatically the method of making a fluted board in accordance with the principles of this invention; Fig. 2 is a plan view partly in section of the apparatus shown in Fig. 1; Fig. 3 is a perspective of a fragment of board of this kind; Fig. 4 is a sectional detail showing the board under the fluting roll; and Fig. 5 illustrates a support for the edge of the board in an intermediate position.

At present wallboard is made by feeding a plastic core including calcined gypsum and water between two sheets of paper as they run through or between master or forming rolls. In the present invention the plastic material is fed continuously upon a bottom fibrous sheet which is turned up at the edges to contain the plastic mixture, the plastic material is spread out and evened up and is partially formed or gauged by means of a roller before the plastic material reaches the fluted roll which may be run at a high speed, or at a different speed with respect to the movement of the bottom sheet and the plastic mix thereon. The fluted roll is run at a different speed, and may also be heated, to prevent the plastic gypsum mixture from sticking thereto where it comes in contact with the roll, since there is no paper cover over the plastic material at this point. A scraper or wiper is also provided to engage the fluted roll for cleaning it and the roll may be mounted to swing above the plastic mix so that the grooves or corrugations may be interrupted leaving a transverse strengthening rib the full cross section of the plastic material. After passing the fluted roll the top sheet is applied after first turning over the side edges of the bottom sheet inwardly and this top sheet adheres to the fluted projections of the plastic mix just as it does in the solid mixture board. Before its application the under side of the top sheet may be sprayed with liquid or with a thin mixture of gypsum in suspension, which will aid in its adherence to the fluted plastic core. Either a folded edge or an open edge board can be made by this same process and the board after being formed is cut and dried, and further processed the same as standard board.

Referring more particularly to the drawing, a bottom sheet 1 is led from a roll 2 under a direction roller 3 where it comes in contact with the supporting table 4 and is engaged by scoring devices 5 and 6 to make folding scores 7 and 8.

The bottom sheet is drawn along the table 4 between side folders 9 which turn up the edges along the scored lines 8 at each side of the paper forming a moving container for receiving a plastic mixture 10 which is deposited continuously on top of the bottom sheet 1 by the transverse conveyor 11. The plastic mass is gauged in thickness or partially formed by passing between the forming rollers 12 and 13 above and below the board, and the turned up edges of the roller sheet 1 are held in place by the vertical belt 14 one at each side end of the roller 12.

After the plastic mass passes the intermediate forming rolls 12 and 13 it next reaches the fluting roll 15 which comprises a plurality of continuous grooves 16 of substantially uniform depth extending entirely around the roll so that the rotation of this roller 15 will produce corresponding projections and grooves in the plastic mass as it passes under the roller. The roller 15 is preferably run at a comparatively high rate of speed so that it will not adhere to the plastic mix and it performs the function both of a smoother and a corrugator for the plastic mixture on the bottom sheet 1. This roller may also be heated to prevent the plastic mix from adhering thereto, and a scraper or wiper 24 is mounted to engage with the surface of the roller after its contact with the plastic mix, for keeping it clean. By mounting the roller 15 upon arms 25 to swing it upwardly the grooves or corrugations may be interrupted at intervals to form a transverse rib 26 which strengthens the board thus formed and gives it better thermal insulation.

The plastic mixture thus fluted after it leaves the forming roller 15 is suitably supported at the side edges, and the upturned sides of the bottom cover sheet next reach the edge turning devices 17 which fold over the upper portions of the marginal edges on the fold line score line 7 just in advance of the main board forming rollers 18 and 19.

A top or cover sheet 20 is directed continuously from a roll 21 of material passing partly around the upper forming roller 18 and is applied by it to the upper surface of the fluted plastic mass and to the turned in margins of the lower cover sheet 1.

In order to moisten, or to coat the surface of the top cover sheet, a spray pipe 27 extends in advance of the roller 18 and directs liquid or a liquid mixture of gypsum, sizing, or adhesive upon the entire under surface of the cover sheet 20.

The marginal edges of the board are supported under the board forming rollers 18 and 19 by means of a vertical belt 22 and after the board passes the forming rollers it is additionally ironed, carried, and formed by the horizontal belt 23. The board thus formed is carried along continuously on the table 4, where it becomes further set and is then cut, dried, and further processed the same as any standard board.

To all appearances the wallboard made by this process is the same as one with a solid plastic mix. The tops of the fluted ridges engage the top sheet of paper and hold it in proper position with respect to the rest of the plastic material. The fluted recesses lighten the board, give it better insulation, and effect a saving in the actual amount of plastic material to produce the board. It is obvious that an open edge board can be made by substantially the same process by simply omitting the edge folding devices as shown in the present exemplification.

I claim:

1. A plaster wallboard having a fluted core of plastic material, and a paper covering on each face of said wall board, one covering being adhesively applied after the formation of the fluted core.

2. A plaster wallboard comprising a pair of parallel fibrous cover sheets, and a plastic core between and adhering to the cover sheets, the core being formed with longitudinal parallel grooves extending in one face of the board and forming a fluted interior, the crest of the flutes being adhesively secured to one of said cover sheets.

3. A plaster wallboard comprising a core of plastic material, and fibrous cover sheets adhesively bonded to the plastic material, one cover sheet contacting only with the top of the corrugation, the core being formed with longitudinal corrugations with a transverse rib at intervals, said rib being free of corrugations and serving to strengthen the wall boards, the corrugations, cover sheets, and ribs forming closed insulating spaces in the board.

4. A plaster wallboard comprising a bottom cover sheet, a plastic layer with parallel flutings extending partially therethrough on the side opposite the bottom cover sheet, and a top sheet adhesively engaging the ridges of the core.

5. A plaster wallboard comprising a bottom cover sheet, a plastic layer with corrugations interrupted at intervals to form cross ribs free of corrugations, and a top cover sheet, the cover sheets adhesively bonding with the plastic layer and adhering to the cross ribs and the ridges of the corrugations.

6. The method of making plaster wallboard which comprises continuously applying plastic material to a moving cover sheet, forming longitudinal flutes in the plastic material, and adhesively attaching a second moving cover sheet to the crests of said flutes before said material sets.

7. The method of making a fluted wallboard which comprises applying a plastic mass to a moving cover sheet, in moving the mass on the cover below a corrugating member which engages the mass, in raising the member at intervals to form a transverse rib free of corrugations in the mass, and applying a second moving cover sheet to the crests of said corrugations.

8. The method of making plaster wallboard which comprises applying a plastic mass to a moving cover sheet, and in forming longitudinal grooves in the plastic mass with a fluting roller, said roller being heated to prevent said plastic mass from adhering to said roller.

9. The method of making fluted wall board which comprises supplying a moving layer of plastic material, engaging the upper surface of the material with a corrugating member, and in wiping the surface of the member to keep it free from the accumulation of plastic material.

10. The method of making fluted wallboard which consists in passing a continuous layer of plastic material under a rotating fluted roller, in raising the roller at intervals free from engagement with the plastic material, and in wiping the surface of the roller after its engagement with the plastic material.

11. The method of making plaster wallboard which includes continuously applying plastic material to a moving cover sheet, in preliminarily smoothing out the plastic material to substantially uniform thickness on the cover sheet, in thereafter forming longitudinal parallel grooves therein which extend only partially through the plastic material, and in applying the second cover sheet to said wall board before said plastic material has set.

12. The method of making fluted wallboard which consists in passing a layer of plastic material under a corrugating roller, in applying a cover sheet to the ridges of the plastic corrugations, and in coating the applied surface of the cover sheet with a bonding liquid prior to its application to the plastic material.

13. The method of making plaster wallboard which comprises continuously supplying a bottom cover sheet and turning up the opposite edges thereof, applying plastic material thereto, preliminarily gauging the thickness of the plastic material on the cover sheet, longitudinally grooving the upper face of the plastic material to form parallel flutings therein, folding over the upturned edges of the lower cover sheet, and applying an upper cover sheet to the fluted surface of the plastic material and to the turned over edges of the lower sheet.

14. The method of making plaster wallboard with a fluted core which consists in continuously advancing a lower cover sheet with plastic material deposited thereon, in preliminarily and uniformly gauging the thickness of the plastic material on the cover sheet, in longitudinally grooving the upper face of the plastic material to form a fluted core, and in applying an upper cover sheet to the ridges of the fluted core.

15. The method of making fluted core wallboard which consists in advancing a lower cover sheet with a layer of plastic material thereon under a corrugating roller, in raising the roller at intervals, and in applying a top cover sheet of which the under surface has been treated with bonding material to the corrugated ridges of the plastic material.

16. The method of making fluted core wallboard which comprises advancing a lower cover sheet with a layer of plastic material thereon under a corrugating roller, in raising the roller at intervals and in wiping the surface thereof continuously, in applying a top cover sheet to the ridges of the plastic material, and in treating the applied surface of the top cover sheet with a liquid bonding solution prior to its application to the plastic material ridges.

17. The method of making plaster wallboard with a fluted core which consists in continuously supplying a lower cover sheet with a plastic material thereon, in gauging the thickness of the material on the cover sheet, in longitudinally grooving the upper face of the plastic material, in passing the lower cover sheet and the core thus formed through a board former which applies a top cover sheet, and in supporting the edges of the board during and after the board forming operations.

18. The method of making plaster wallboard with a longitudinally fluted core which consists in continuously advancing a fibrous cover sheet with a plastic material thereon, in scoring the opposite edges of the cover sheet and turning them up edgewise to contain the plastic material, in leveling and partially gauging the thickness of the plastic material on the cover sheet, and in supporting the turned up edges of the cover sheet during this operation, in longitudinally grooving the upper face of the plastic material in folding over inwardly the upstanding edges of the bottom cover sheet, in passing the lower cover sheet and the core thus formed through board forming rolls and in applying an upper cover sheet to the ridges of the core thus formed, the cover sheets bonding to the plastic core, in supporting the edges of the board during the board forming operation and thereafter, and in pressing down the edges of the board thus formed after the board forming operation until the plastic core is partially set.

HARRY E. BROOKBY.